United States Patent [19]

Qureshi et al.

[11] Patent Number: 4,756,007
[45] Date of Patent: Jul. 5, 1988

[54] ADAPTIVE COMMUNICATION RATE MODEM

[75] Inventors: Shahid U. H. Qureshi, Natick; Karl W. Seitz, Norfolk; Robert M. Wilson, Walpole, all of Mass.

[73] Assignee: Codex Corporation, Mansfield, Mass.

[21] Appl. No.: 587,386

[22] Filed: Mar. 8, 1984

[51] Int. Cl.[4] ............................................ H04L 27/00
[52] U.S. Cl. ........................................ 375/37; 375/8; 379/93; 370/84
[58] Field of Search .................... 375/7, 8, 9, 10, 13, 375/58, 43, 37; 370/84; 371/37, 40, 43, 45, 5; 179/2 DP

[56] References Cited

U.S. PATENT DOCUMENTS

| 3,449,716 | 6/1969 | Brothman et al. | 371/5 |
|---|---|---|---|
| 3,534,264 | 10/1970 | Blasbalg et al. | 375/58 |
| 3,536,840 | 10/1970 | Sullivan | 375/46 |
| 3,665,394 | 5/1972 | Lender | 340/146.1 AX |
| 3,810,019 | 5/1974 | Miller | 375/58 |
| 4,089,061 | 5/1978 | Milewski | 375/13 |
| 4,110,558 | 8/1978 | Kageyama et al. | 375/1 |
| 4,168,401 | 9/1979 | Molleron et al. | 370/84 |
| 4,229,815 | 10/1980 | Cummiskey | 370/84 |
| 4,393,508 | 7/1983 | Boudault | 375/10 |
| 4,447,908 | 5/1984 | Chevillat et al. | 375/42 |
| 4,484,338 | 11/1984 | Clark et al. | 371/43 |
| 4,485,468 | 11/1984 | Slana | 370/84 |
| 4,524,244 | 6/1985 | Faggin et al. | 179/2 DP |
| 4,589,111 | 5/1986 | Adachi | 371/32 |
| 4,606,044 | 8/1986 | Kudo | 385/13 |

FOREIGN PATENT DOCUMENTS 81301724.1 4/1981 European Pat. Off. .
85301614.5 3/1985 European Pat. Off. .

OTHER PUBLICATIONS

CCITT Draft Recommendation V.32 for a Family of 2-wire, Duplex Modems. . .
CCITT "Questions Entrusted to Study Group XVII (Data Communication Over the Telepone Network) For the Period 1981–1984", (VIIth CCITT Plenary Assembly, Geneva, Nov. 10–21, 1980).
Second Duplex Modem. . .
Bryant et al., "Line Quality Monitoring Method", IBM Disclosure Bulletin, vol. 18, No. 8, Jan. 1976.
Abstract, Japanese Appln. No. 57–133459, filed 7-2-9-82, vol. 8, No. 107, (E–245) [1544] May 19, 1984.
CCITT Draft Recommendation V.22 bis–2400 bits per second duplex modem.
IBM 3865 LPDA Support (9600 bps)–Manual.
"The 3M EMT TM 9160 Digital Facsimile Transceiver (advertisement).

Primary Examiner—Robert L. Griffin
Assistant Examiner—Stephen Chin

[57] ABSTRACT

In a modem that transmits signals to and receives signals from a remote device at a multiplicity of communication rates, the quality of the channel is monitored, a communication rate is selected based on the channel quality, the desire for an increased rate is indicated, and the increased rate is implemented by the modem when the remote device concurs.

28 Claims, 5 Drawing Sheets

ADAPTIVE COMMUNICATION RATE MODEM

BACKGROUND OF THE INVENTION

This invention relates to modems, devices which transmit digital signals over band-limited channels, e.g., telephone lines.

Some modems are capable of operating at different transmission rates at different times. A higher rate is used when the line conditions are good; a lower rate is used as a fall back rate when line conditions are poor and an unacceptably high error rate would result from using the higher rate.

Generally, both the transmitting modem and the receiving modem must process data at the same rate in order to communicate. A known way of achieving that is to have the transmitting modem transmit, as part of its set-up sequence at the beginning of a transmission to the receiving modem, a tone or other information unique to the transmitted data rate which will be recognized by the receiving modem and allow it to coordinate its data rate with the transmitted rate. CCITT Recommendation V.22 and Draft Recommendations V.22 bis and V.32 define dual rate dial-up modems having versions of such a rate coordination feature.

Some modems also have the ability to monitor the quality of the line over which transmission is to occur or is occurring.

The CCITT has recommended, in its "Questions Entrusted To Study Group XVII (Data Communication Over The Telephone Network) For the Period 1981-1984" (VIIth CCITT Plenary Assembly, Geneva, Nov. 10-21, 1980) that it would be desirable for modems to have the "ability to adapt the data signalling rate to line quality" (id. p. 12).

SUMMARY OF THE INVENTION

In general, the invention features in one aspect a modem which includes transmission means for transmitting information signals to a remote device over a channel at any one of a multiplicity of communication rates, reception means for receiving information signals from the remote device over the channel at any one of the communication rates, quality-monitoring means for monitoring the quality of the channel on the basis of the received information signals, and rate control means responsive to the quality-monitoring means for selecting a current communication rate based on the channel quality, the rate control means including fall forward means for indicating that an increase in the current communication rate to a higher communication rate is desired and for implementing the increase when the remote device concurs.

In another aspect the modem includes transmission means for transmitting information signals to a remote device over a channel at any one of a multiplicity of transmission rates, reception means for receiving information signals from the remote device over the channel at any one of a multiplicity of reception rates, quality-monitoring means for monitoring the quality of the channel on the basis of the received information signals, and rate control means responsive to the quality-monitoring means for selecting a current reception rate based on the channel quality, the rate control means including fall forward means for indicating that an increase in the current reception rate to a higher reception rate is desired and for instructing the remote device to implement the increase.

In preferred embodiments the rate control means further includes fall back means for making fall back decisions which unilaterally decrease the current communication rate to a lower communication rate; the reception means further includes adaptive equalization and demodulation circuitry for equalizing and demodulating the received information signals using adaptive equalization and demodulation parameters which have initial values, and the rate control means further includes save equalizer means responsive to the quality-monitoring means for updating the values when the channel quality is good and for reinitializing the values when the channel quality is poor; the information signals include data signals which include signal points corresponding to a data bit pattern being communicated, the quality-monitoring means further includes means for measuring the dispersion of the signal points received over the channel around ideal signal points corresponding to the received signal points, and the fall forward means further includes means for indicating that the higher communication rate is desired on the basis of the measure when the measure is less than a predetermined threshold for at least a predetermined percentage of a predetermined time period; the information signals include first rate signals corresponding to the current communication rate and second rate signals corresponding to the higher communication rate desired by the fall forward means, the modem further includes memory means for storing the transmitted second rate signal transmitted by the transmitting means and the received second rate signal received by the reception means and comparison means for comparing the transmitted and received second rate signals and means for implementing a current communication rate which is the lesser of the transmitted and received second rate signals, the information signals include data signals corresponding to a data bit pattern being communicated, the reception means further includes decision means for determining the data bit pattern on the basis of the received data signals, the quality-monitoring means further includes means for estimating the number of errors made by the decision means, (the error rate of reception over said channel), and the fall back decisions are made on the basis of the estimate; the reception means further includes decision means for determining the data bit pattern on the basis of the received data signals using a Viterbi algorithm which include means for making a tentative decision as to the signal points received corresponding to each of the data signals upon receipt of the data signals and a corresponding final decision as to the received signal points after a predetermined number of the data signals have been received and means for detecting a discrepancy between the tentative decision and the corresponding final decision, the quality-monitoring means further including averaging circuitry for producing an average discrepancy which is an estimate of the error rate of transmission over the channel, and fall back decisions are made on the basis of the estimate when the estimate exceeds a predetermined threshold for a predetermined time period; the modem is initially trained to receive the information signals over the channel and wherein retraining of the modem is initiated when the estimate exceeds a predetermined threshold for a predetermined time period; and fall back decisions are produced upon the occurrence of a predetermined number of retraining initiations in a predetermined time period.

The invention allows pairs of modems in point-to-point dedicated or switched network applications to automatically adjust the rate to the maximum rate which the line can support. If line conditions improve, the rate automatically increases; if line conditions deteriorate, operation automatically proceeds at a lower rate until conditions improve. This invention is particularly useful in host-to-host and internodal links, where optimized throughput is a major concern, and in networks where the first tier is point-to-point supporting synchronous devices such as terminals or printers.

Other features and advantages of the invention will be apparent from the following description of the preferred embodiment, and from the claims.

DESCRIPTION OF THE PREFERRED EMBODIMENT

We first briefly describe the drawings.

DRAWINGS

STRUCTURE

Figure 1:
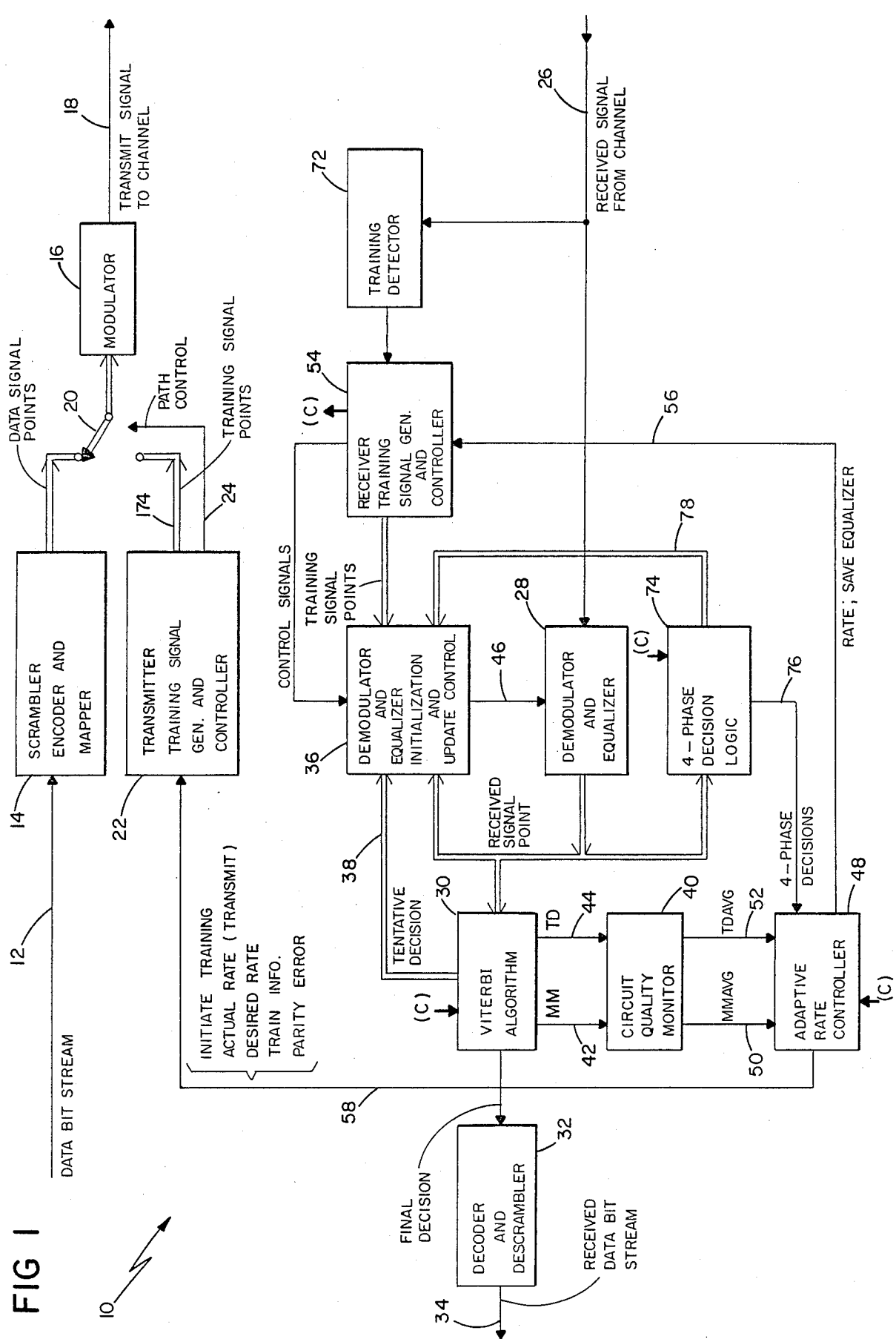
FIG. 1 is a block diagram of a modem embodying the invention.

Referring to FIG. 1, in modem 10 data bits to be transmitted are received over line 12 and processed by scrambler-encoder-mapper 14, which randomizes the data bits to ensure that any bit pattern is as likely to be sent as any other bit pattern, encodes the bits according to the coding system being used, and maps the resulting signal points onto the signal constellation being used as is known in the art. The signals are then modulated by modulator 16 for transmission over line 18 as is also known in the art. When a training sequence is to be sent, scrambler 14 is bypassed by causing switch 20 to switch to the transmitter training signal generator and controller (TTSGC) 22 using a signal over path control line 24.

Incoming signals are received over line 26 and equalized and demodulated at 28. Viterbi algorithm logic 30 sends final decisions regarding the received signal points to decoder/descrambler 32 (which produces the data bit stream over line 34), sends tentative decisions to demodulator and equalizer initialization and update control 36 over line 38, and sends minimum metrics and trellis discrepancies (explained below) to circuit quality monitor (CQM) 40 over lines 42 and 44, respectively. The operation of a Viberbi decoder is explained generally in Forney, "The Viterbi Algorithm", Proceedings of the IEEE, Vol. 61, No. 3, March 1973 and as applied to modem operations in Forney System Coding Apparatus, U.S. Ser. No. 439,740, filed Nov. 8, 1982, both of which are hereby incorporated by reference. Demodulator and equalizer initialization and update control 36 sends updated demodulator phase and equalizer coefficients to demodulator-equalizer 28 over line 46. CQM 40 calculates and transmits average minimum metrics and average trellis discrepancies to adaptive rate controller (ARC) 48 over lines 50, 52, respectively.

ARC 40 sends rate and save equalizer signals (explained below) to receiver training signal generator and controller (RTSGC) 54 over line 50 and sends the training sequence which is to be transmitted over line 58 to TTSGC 22, which inserts the training sequence into the stream of data signal points fed to modulator 16 as explained above.

Figure 2:
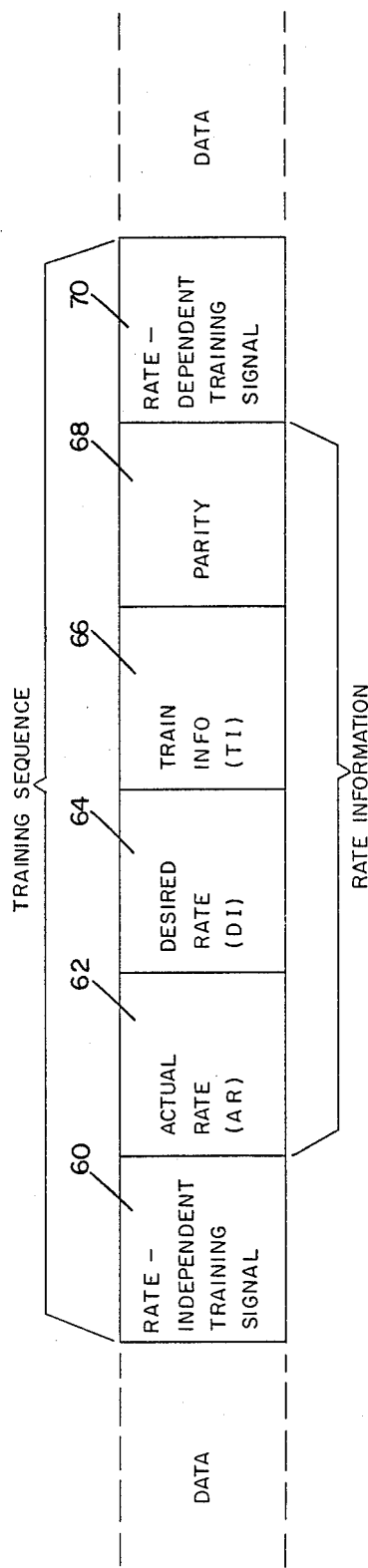
FIG. 2 is a diagram of a sequence of signals used in operation of the modem.

FIG. 2 illustrates a training sequence. The training sequence is sent (1) at system initialization, (2) when a new higher or lower communication rate is implemented, (3) when retraining is needed at the current rate to equalize the modem to the line conditions, or (4) when a higher communication rate is desired. At system initialization, or power up, the training sequence is followed but not preceded by data signals. At all other times, the training sequence is inserted into data transmission such that data signals precede and follow the training sequence, as shown by the dotted lines in FIG. 2.

Block 60 of FIG. 2 represents a fixed-length rate-independent training signal (RITS) consisting of three segments. The first segment, a tone at the carrier frequency lasting for about 43 ms, serves to indicate to the receiving modem the presence of a training sequence. This segment may also be used at the receiver to acquire the carrier frequency, phase and gain. The second segment of RITS 60 is about 47 ms long during which a periodic equalizer conditioning pattern is transmitted to enable rapid establishment of initial equalizer coefficients and other receiver parameters as required. The modulated signal in the second segment begins with a phase which is 180° from the phase of the carrier tone transmitted during segment 1. This phase transition is used to achieve synchronization in the receiver so that the beginning of each subsequent portion of the training sequence can be identified. The third segment of RITS 60 is a pseudo-random four-phase modulated signal transmitted for 100 ms to enable further adjustment of adaptive equalizer coefficients and other receiver parameters.

Block 62 contains the two-bit actual rate signal (AR), which indicates the rate at which data is actually being transmitted, e.g., 9.6 kb/s, 12.0 kb/s, 14.4 kb/s, or 16.8 kb/s. The AR can be the same as the previously-transmitted AR (as when it is sent as part of a fall forward initiation or an unattended initiate, explained below), can be a level higher than the previously-transmitted AR (as when it is in a concurring response to a fall forward initiation), or can be a level lower than the previously-transmitted AR (as when it is a unilateral fall back).

Block 64 contains the two-bit desired rate signal (DR), which indicates the maximum rate at which the transmitting modem could operate. The DR is always either the same as or one level higher than the AR. It is the same as the AR if it is sent in a concurring response to a fall forward request or in a unilateral fallback; it is higher if sent as part of a fall forward initiation or in response to a request for a train from the remote device.

Table 1 shows the bit sequences which correspond to the rates at which the modems can operate. The same bit sequences are used for each rate whether the rate is the AR or the DR.

TABLE 1

| Rate (kb/s) | Bit Sequence |
| --- | --- |
| 9.6 | 00 |
| 12.0 | 01 |
| 14.4 | 10 |
| 16.8 | 11 |

Block 66 contains the two-bit train information signal (TI), which indicates whether the transmitting modem wishes to receive a response to the train being sent. When the TI is 00, no response is requested and usually no response will be sent. If the TI is 11, a response is requested. Note that a response may be sent when the received TI is 00 if the parity bits indicate that an error has been made.

Block 68 contains the two-bit parity signal. The first bit of the parity signal is an add modulo two performed on the first bits of the AR, DR, and TI; the second bit of the parity signal is an add modulo two performed on the second bits of the AR, DR, and TI.

Block 70 contains the Rate-Dependent Training Signal (RDTS). The RDTS is a variable-length rate-dependent segment during which the same type of pseudo-random four-phase modulated signal is transmitted as in segment 3 of RITS 60 permit the receiver parameters to be fine tuned for high-rate data signals. The RDTS varies in length depending on the rate set as the AR, as shown in Table 2.

TABLE 2

| Rate (kb/s) | Length of RDTS |
| --- | --- |
| 9.6 | (none) |
| 12.0 | 100 ms |
| 14.4 | 200 ms |
| 16.8 | 300 ms |

Training sequences in the incoming data stream are detected by training detector 72 (FIG. 1), which recognizes the first segment of the RITS as an indication that the training sequence is present and sends an indication that the training sequence is present to RTSGC 46.

RITS 60 is either used to initialize (reset) all adaptive parameters, e.g., equalizer coefficients, in the receiving modem or to fine tune them, depending on the events leading up to the receipt of that training sequence. The save equalizer signal sent by ARC 48 to RTSGC 54 over line 56 controls whether the adaptive parameters are reset or fine tuned. If the train is received in a concurring response to a request for a higher rate (fall forward initiation), the save equalizer signal is true and the RITS is used to fine-tune the adaptive parameters since if a higher rate is requested it is assumed that the modem is already fairly well equalized to the line. If the train is received in response to a request to retrain the modem to the current or a lower rate, i.e., in response to the unattended initiate signal (explained below), the save equalizer signal is false and the RITS 60 is used to reset or initialize the adaptive parameters to preset values.

At the end of RITS 60 RTSGC 54 sends control signals to activate the 4-phase decision logic 74 to recognize the next received signal points as rate and training information and to send that information to ARC 48 over line 76 and to demodulator and equalizer initialization and update control 36 over line 78. RTSGC 54 also sends control signals to other components of the modem, e.g., ARC 48 and Viterbi logic 30 as is shown generally by the arrows designated (C).

The rate at which the modems operate is dependent upon the quality of the channel over which signals are received, i.e., line 26 of FIG. 1, which is monitored by the circuit quality monitor (CQM) as follows.

For each signal point decision made by Viterbi algorithm logic 30, CQM 40 receives a trellis discrepancy over line 44, which is used in fall back decisions, and a minimum metric over line 42, which is used for fall forward decisions. To generate the trellis discrepancy, the most recent tentative decision in Viterbi algorithm logic 30 is fed into a delay circuit, which feeds that tentative decision to a comparator when the final decision corresponding to that tentative decision is made and fed into the comparator, e.g., 16 signal intervals later. If the decisions are the same (indicating that the tentative decision was correct), the trellis discrepancy is 0; if the decisions are not the same (indicating that the tentative decision was incorrect), the trellis discrepancy is 1.

Figure 3:
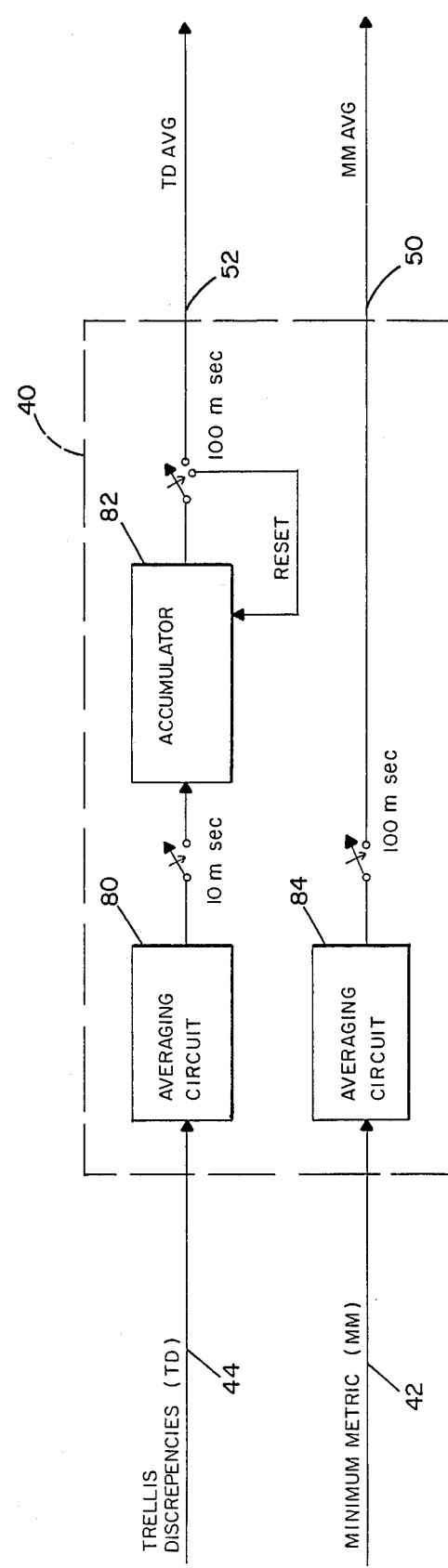
FIG. 3 is a block diagram of the circuit quality monitoring system in FIG. 1.

Referring now to FIG. 3, the trellis discrepancy is fed over line 44 into averaging circuit 80, which keeps a running average of the trellis discrepancies. The resulting average trellis discrepancy is sampled every 10 ms and fed to accumulator 82. Every 100 ms (10 samples) the accumulated value is sent out as TDAVG over line 52 to adaptive rate controller 48 (FIG. 1) and the accumulator 82 is reset to zero.

CQM 40 also receives the minimum metric from Viterbi algorithm logic 30 for each signal point decision made. In preferred embodiments an 8-state code is used such as that described Ungerboeck, "Channel Coding with Multilever/Phase Signals", IEEE Transactions on Information Theory, Vol. IT-28, No. 1, January, 1982, hereby incorporated by reference. For each received signal point the squared distance to the closest point in each subset of the signal constellation is conputed. The accumulated squared distance to each of the eight states of the trellis is termed the metric. Each symbol interval, based on the received signal point, the metric and the path history leading to each state is updated and the most likely path to each state is chosen as the one having the smallest metric to that state. The metrics for all eight states are then compared to select the minimum metric. The final decision is the decision index corresponding to the signal point received a certain number of signal intervals ago, e.g. 16. This decision index is taken from the most likely path, i.e., that is the path leading to the state with the minimum metric. The minimum metric is fed into averaging circuit 84; the average minimum metric is sent out as MMAVG every 100 ms over line 50 to ARC 48 (FIG. 1). In the Viterbi algorithm logic 30, the minimum metric is subsequently subtracted from the metric for each state to prevent metric growth without bound.

Figure 4:
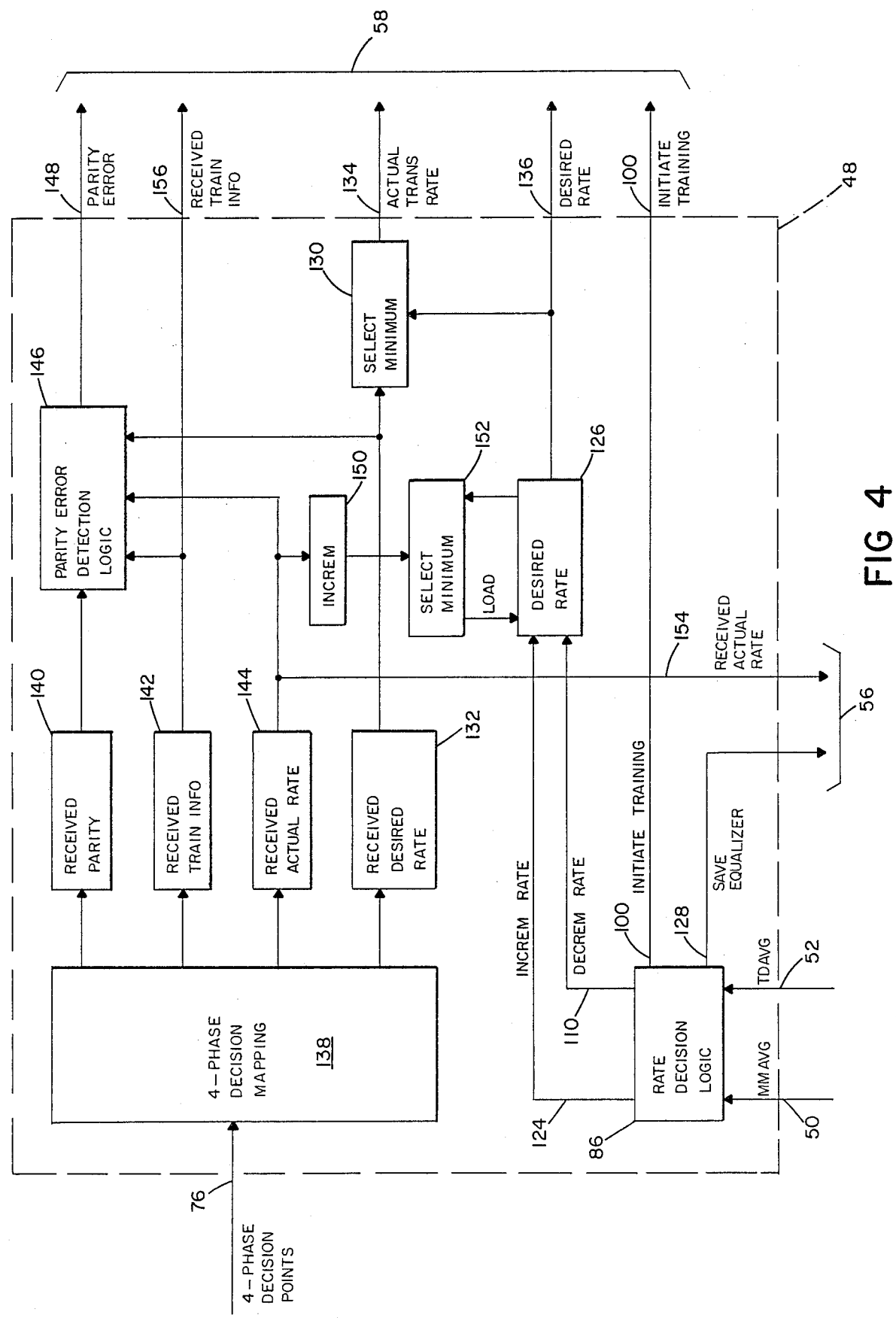
FIG. 4 is a block diagram of the adaptive rate controller in FIG. 1.

ARC 48 receives MMAVG and TDAVG over lines 50, 52, respectively, and feeds the signals to rate decision logic 86, shown in FIG. 4.

Figure 5:
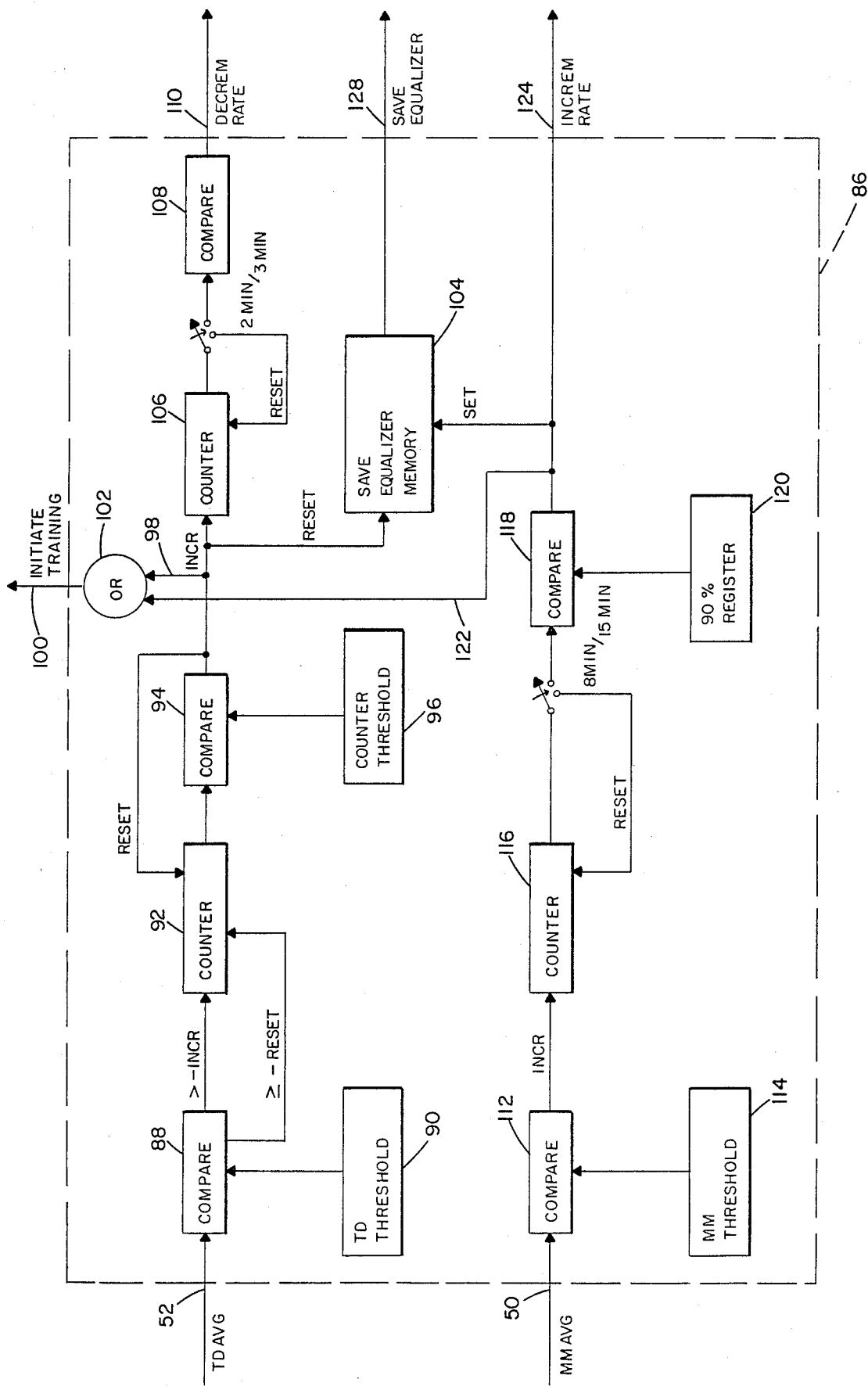
FIG. 5 is a block diagram of the rate decision logic in FIG. 1 for fall back and fall forward decisions.

For fall back decisions, the rate decision logic (RDL) is looking for TDAVG to be greater than a threshold value for a prechosen number of consecutive times. The rate decision logic for fall back decisions is shown in FIG. 5. As there shown, TDAVG is fed to comparator 88 and compared at the sampling rate with a preset threshold value from register 90. If TDAVG (which is a measure of the estimated actual rate) is greater than the threshold value, counter 92 is incremented; if TDAVG is less than or equal to the threshold value, counter 92 is reset to zero. The value held in counter 92 is continuously compared in comparator 94 with a preset counter threshold held in register 96. If the counter value exceeds the counter threshold, an unattended initiate (UI) is triggered over line 98 which feeds into initiate training line 100 through OR gate 102, counter 92 is reset, save equalizer memory 104 is reset, and counter 106 is incremented. The UI causes a training sequence to be sent with a return requested without changing the current AR in an attempt to equalize to the line conditions. Counter 106 is sampled and reset every two or three minutes, depending on the mode previously chosen by the operator. In the first mode, if there have been three UIs in two minutes, as determined in comparator 108, a decrement-rate signal is sent out over line 110. In the second mode, six UIs must occur in three minutes for a decrement-rate signal to be sent out. In either mode, the thresholding arrangement minimizes premature and unnecessary fall back.

For fall forward decisions, the RDL is looking for MMAVG to be less than a prechosen value for a given percentage of a prechosen time period. The rate decision logic for fall forward decisions is also shown in FIG. 5. As shown, MMAVG is fed to comparator 112 and compared with a preset threshold value from register 114. MMAVG (which is a measure of the dispersion of the received signals points around the ideal signal point for each decision) is used for fall forward decisions because when line quality is good, TDAVG will be so low as to be statistically less meaningful than MMAVG. If MMAVG is below the preset threshold value, counter 104 is incremented. Every 8 or 15 minutes, depending on the mode previously chosen by the operator, counter 116 is sampled and then reset. The value in counter 116 is compared at 118 with the value in register 120, which corresponds to 90% of the total possible counts in the time period chosen by the operator. That is, since MMAVG is sampled every 100 ms 10 MMAVG values are sent to the comparator per second. If the operator chooses a counter sampling rate of 8 minutes, the value in register 120 will be 90% of 10 samples/sec times 8 minutes. Likewise, if the 15-minute mode is chosen, the value in register 120 will be 90% of 10 samples/sec times 15 minutes. If the value in counter 116 is greater than or equal to the value in register 120, an increment-rate signal is sent out over line 122 to initiate training line 100 through OR gate 102 and is sent over line 124 to desired rate logic 126 (FIG. 4) and the save equalizer memory 104 is set to the true position. The save equalizer signal is asserted over time 128.

The modes chosen by the operator, i.e., 3 UIs/2 min. vs. 6 UIs/3 min. for fall back and 8 min. vs. 15 min. for fall foward, will depend on line conditions and on the specific application. If there is a possibility of relatively rapid fluctuations in line conditions, the modes may be chosen to allow the rates to be adjusted quickly. However, since data transmission is interrupted whenever the rate is changed (since the modems must be retrained to the new rate) it may be desirable to wait longer between rate changes, especially if the data being transmitted is relatively intolerant to interruptions. There is thus a trade-off between having uninterrupted data transmission and possibly giving up more time at a higher transmission rate.

Referring again to FIG. 4, the increment-rate and decrement-rate signals are sent out over lines 124, 110, respectively, from rate decision logic 86 to desired rate logic (DR logic) 126. If DR logic 126 receives an increment-rate signal, the DR which is inserted into the training sequence sent as a result of the initiate training signal over line 100 is set one rate higher (using the bit patterns shown in Table 1 above), which has the effect of initiating a fall forward request; if a decrement-rate signals is received the DR inserted into the training sequence is set one rate lower, which has the effect of immediately effecting a fall back if the DR and AR were previously the same. That is, the select minimum circuitry 130 compares the rate from DR logic 126 with the DR received in the most recent training sequence from the remote modem and stored at 132. The lesser of the two rates is set as the AR over line 134 for incorporation into the training sequence to be sent. The DR from logic 126 is also sent directly over line 136 as the DR for incorporation into the training sequence.

The 4-phase decision mapper 138 in ARC 48 receives the 4-phase decision points corresponding to the training sequence from 4-phase decision logic 74 over line 76 (FIG. 1), converts the signal points to bits, and stores the received parity bits 68, received training information 66, received AR 62, and received DR 64 (as described in FIG. 2) at 140, 142, 144, and 132, respectively. The bits stored at 132, 142, and 144 are combined by mod two addition logic in parity error detection logic 146 to generate the parity bits (as described above), which are compared with the received parity stored at 140; any parity error is signaled over line 148.

The received AR is incremented at 150 and compared in select minimum logic 152 with the DR from DR logic 126. The lesser of the two rates is reentered in DR logic 126 as the new desired rate; thus the desired rate is never more than one level above the actual rate. The received AR is also sent out over line 154 to be sent over line 56 to the RTSGC 54, as described above.

The DR (Line 136), initiate training signal (line 100), AR (line 134), TI (line 156), and parity error (line 148) are all sent over line 58 to transmitter training signal generator and controller (TTSGC) 22 as shown in FIG. 1.

Figure 6:
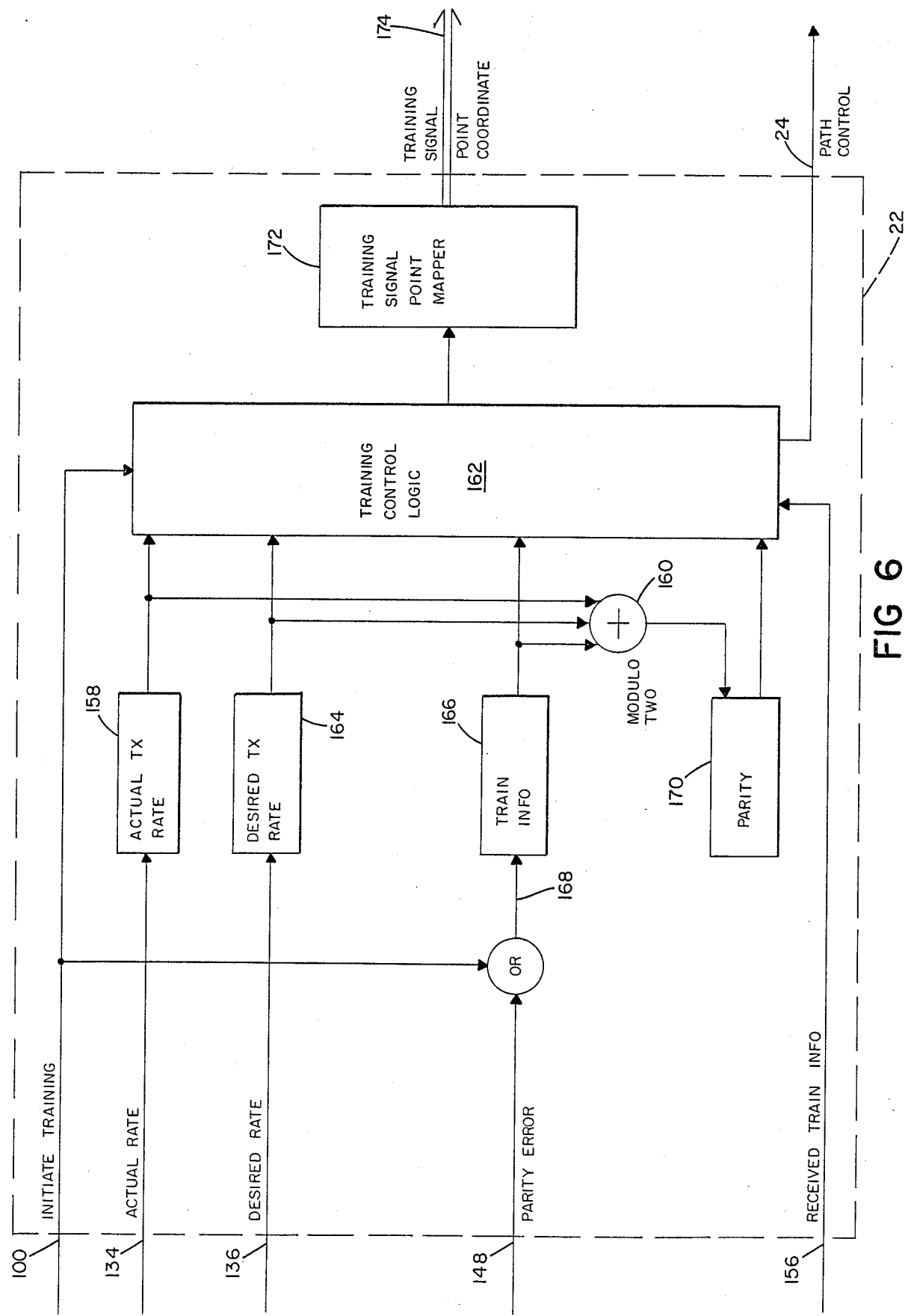
FIG. 6 is a block diagram of the transmitter training signal generator and controller in FIG. 1.

Referring now to FIG. 6, the AR over line 134 sets the actual transmission (TX) rate 158 which is sent to mod two addition logic 160 and training control logic (TCL) 162. The DR from line 136 likewise sets the desired TX rate 164 which is sent to mod two addition logic 160 and TCL 162. If the train info logic 166 receives a signal on line 168, indicating either that an initiate training signal is present (due to a fall forward request unattended initiate) or that there is a parity error (received over line 148), the TI bits are set to 11 to request a return train. The parity bits resulting from the add modulo two function performed on the AR, DR, and TI bit and stored at 170 are also sent to TCL 162. TCL 162 sends the training sequence resulting from the combination of the input signals to training signal point mapper 172 when either the initiate training signal is asserted over line 100 or when the received train info signal is asserted over line 156, indicating that a return train has been requested. The training signal point coordinates are sent over line 174 to modulator 16 (while the path control signal is asserted) for transmission to the remote modem (FIG. 1).

Operation

At power-up, the initiating modem sends a train as described in which the AR is a pre-determined rate, the DR is the same as the AR, the TI is set to request a response, and the RDTS is set according to the AR; the initiating modem also stores its DR. When the remote modem receives the train it stores the initiating modem's DR, its CQM begins monitoring its inbound line, and a return train is sent. The initiating modem receives the return train, stores the remote modem's DR, and likewise begins monitoring its inbound line. At power-up the save equalizer memory is false (reset) and so all coefficients are initialized and the modems are trained from scratch. Operation continues at the established rate until further information is received either from the local (initiating modem's) CQM or on a train from the remote modem.

Either modem can establish a lower rate of operation (i.e., force a fall back). When the error rate over the inbound line reaches an unacceptable level (as discussed above) the initiating modem resets its local DR memory to the next lower rate and sends a train in which the AR and the DR are both set to the lower rate. When the remote modem receives the train, it retrains to the lower rate and sends a response with the AR set to the lower rate but with its DR set at the higher rate (the rate which had previously been in place). The initiating modem then retrains at the lower rate and stores the remote modem's DR; both modems operate at the newly-set lower rate until a further rate change is requested.

In order to fall forward, both modems must concur. When a significant increase in line quality is observed (as discussed above) the initiating modem checks the DR of the remote modem which it has stored in memory. If the remote modem's DR is already at the higher rate (a "preauthorization" to shift up), the initiating modem sends a train with both the AR and the DR at the higher rate. This has the effect of training the remote modem to the higher rate and beginning data transmission at that rate. The remote modem returns a train with the AR and DR likewise set at the higher rate to train the initiating modem to the new rate. Both modems operate at the newly-set higher rate until a further rate change is requested.

If the remote modem's DR is the same as the current AR, the initiating modem sends a train with the AR set to the current rate and with the DR set to the next higher rate. The remote modem stores the initiating modem's DR but does not shift to the higher rate. The transmission of the higher DR by the initiating modem serves as a preauthorization to the remote modem to shift to the higher rate when its inbound line quality is sufficient to warrant the shift. The shift then proceeds as discussed above.

In preferred embodiments, the modem has a dual processor architecture, i.e., has a general microprocessor which performs overall control and data movement functions, and a signal processing element which performs functions such as filtering, modulation, and demodulation. A modem of this type is described in copending application Qureshi et al., Processor Interface Circuitry, filed Mar. 6, 1984, which is hereby incorporated by reference.

Other embodiments are within the following claims. For example, the local and remote devices could operate asymmetrically, i.e., using different communication rates in different directions. In this embodiment local device could determine its preferred rate of reception and instruct the remote device to implement that rate, regardless of the remote device's preferred rate of reception and regardless of whether the new rate is higher or lower than the rate at which the local device is transmitting to the remote device. Likewise, the remote device could determine its preferred rate of reception and instruct the local device to implement that rate as the local device's transmission rate regardless of whether the local device concurs that the new rate is its preferred rate of reception.

Further, a fixed standard sequence such as the CCITT Recommendation V.29 can be used as the training sequence; an alternating signal can be used instead of the fixed tone in the first segment of the training sequence; and the local modem could automatically start transmitting at a higher rate with the remote modem either accepting the higher rate, the higher rate thereafter being implemented, or rejecting the higher rate, with transmission thereafter continuing at the previous rate.

What is claimed is:

1. A modem comprising
    transmission means for transmitting information signals to a remote device over a channel at any one of a multiplicity of communication rates,
    reception means for receiving information signals from said remote device over said channel at any one of said communication rates,
    quality-monitoring means for monitoring the quality of said channel on the basis of said received information signals, and
    rate control means responsive to said quality-monitoring means for selecting a current communication rate based on said channel quality, said rate control means comprising
    fall forward means for indicating to said remote device that an increase in said current communication rate to a higher communication rate is desired, based on said channel quality, and for implementing said increase only when said remote device concurs that said current communication rate may be increased, based on its own analysis of said channel quality.

2. The modem of claim 1 wherein said rate control means further comprises fall back means for making fall back decisions which unilaterally decrease said current communication rate to a lower communication rate.

3. The modem of either of claims 1 or 2 wherein
    said reception means further comprises adaptive equalization and demodulation circuitry for equalizing and demodulating said received information signals using adaptive equalization and demodulation parameters which have initial values, and
    said rate control means further comprises save equalizer means responsive to said quality-monitoring means for updating said values when said channel quality is good and for reinitializing said values when said channel quality is poor.

4. The modem of claim 1 wherein
    said information signals comprise signal points,
    said quality-monitoring means further comprises means for measuring the dispersion of said signal points received over said channel around ideal signal points corresponding to said received signal points, and
    said fall forward means further comprises means for indicating that said higher communication rate is desired on the basis of said measure.

5. The modem of claim 4 wherein said measure is an average minimum metric.

6. The modem of either of claims 4 or 5 wherein said fall forward means indicates that said higher communication rate is desired when said measure is less than a predetermined threshold for at least a predetermined percentage of a predetermined time period.

7. The modem of claim 1 wherein said information signals include first rate signals corresponding to said current communication rate and second rate signals corresponding to said higher communication rate desired by said fall forward means.

8. The modem of claim 7 further comprising memory means for storing said first and second rate signals wherein said transmitted second rate signal transmitted by said transmitting means and said received second rate signal received by said reception means are stored by said memory means, and said rate control means further comprises comparison means for comparing said transmitted and received second rate signals and means for implementing a current communication rate which is the lesser of said transmitted and received second rate signals.

9. The modem of claim 2 wherein said information signals include data signals corresponding to a data bit pattern being communicated, said reception means further comprises decision means for determining said data bit pattern on the basis of said received data signals, said quality-monitoring means further comprises means for estimating the number of errors made by said decision means, said number being the error rate of reception over said channel, and said fall back decisions are made on the basis of said estimate.

10. The modem of claim 2 wherein said information signals include data signals corresponding to a data bit pattern being communicated, said data signals comprising signal points, said reception means further comprises decision means for determining said data bit pattern on the basis of said received data signals using a Viterbi algorithm, said decision means comprising means for making a tentative decision as to the signal points received corresponding to each of said data signals upon receipt of said data signals and a corresponding final decision as to said signal points after a predetermined number of said data signals have been received, and means for detecting a discrepancy between said tentative decision and said corresponding final decision, said quality-monitoring means further comprises averaging circuitry for producing an average discrepancy, said average discrepancy being an estimate of the error rate of transmission over said channel, and said fall back decisions are made on the basis of said estimate.

11. The modem of either of claims 9 or 10 wherein said fall back decisions are produced when said estimate exceeds a predetermined threshold for a predetermined time period.

12. The modem of either of claims 9 or 10 wherein said modem is initially trained to receive said information signals over said channel and wherein retraining of said modem is initiated when said estimate exceeds a predetermined threshold for a predetermined time period.

13. The modem of claim 12 wherein said fall back decisions are produced upon the occurrence of a predetermined number of retraining initiations in a predetermined time period.

14. A modem comprising transmission means for transmitting information signals to a remote device over a channel at any one of a multiplicity of transmission rates, reception means for receiving information signals from said remote device over said channel at any one of a multiplicity of reception rates, quality-monitoring means for monitoring the quality of said channel on the basis of said received information signals, and rate control means responsive to said quality-monitoring means for selecting a current reception rate based on said channel quality, said rate control means comprising fall forward means for indicating to said remote device that an increase in said current reception rate to a higher reception rate is desired, based on said channel quality, and for implementing said increase only when said remote device indicates its concurrence in implementing said increase, based on said remote device's analysis of said channel quality.

15. The modem of claim 14 wherein said rate control means further comprises fall back means for making fall back decisions to decrease said current reception rate to a lower reception rate and for instructing said remote device to implement said decrease.

16. The modem of claim 14 wherein said rate control means futher comprises means responsive to said remote device for implementing a current transmission rate, and said increase in said reception rate is implemented only when said remote device indicates to said modem that said remote device desires an increase in said current transmission rate to a higher transmission rate.

17. The modem of claim 16 wherein said higher reception rate implemented by said remote device is the same as said higher transmission rate implemented by said modem.

18. The modem of either of claims 14 or 15 wherein said reception means further comprises adaptive equalization and demodulation circuitry for equalizing and demodulating said received information signals using adaptive equalization and demodulation parameters which have initial values, and said rate control means further comprises save equalizer means responsive to said quality-monitoring means for updating said values when said channel quality is good and for reinitializing said values when said channel quality is poor.

19. The modem of claim 14 wherein said information signals comprise signal points, said quality-monitoring means further comprises means for measuring the dispersion of said signal points received over said channel around ideal signal points corresponding to said received signal points, and said fall forward means further comprises means for indicating that said higher reception rate is desired on the basis of said measure.

20. The modem of claim 19 wherein said measure is an average minimum metric.

21. The modem of either of claims 19 or 20 wherein said fall forward means indicates that said higher reception rate is desired when said measure is less than a predetermined threshold for at least a predetermined percentage of a predetermined time period.

22. The modem of claim 15 wherein
said information signals include data signals corresponding to a data bit pattern being communicated,
said reception means further comprises decision means for determining said data bit pattern on the basis of said received data signals,
said quality-monitoring means further comprises means for estimating the number of errors made by said decision means,
said number being the error rate of reception over said channel, and
said fall back decisions are made on the basis of said estimate.

23. The modem of claim 15 wherein
said information signals include data signals corresponding to a data bit pattern being communicated,
said data signals comprising signal points,
said reception means further comprises decision means for determining said data bit pattern on the basis of said received data signals using a Viterbi algorithm,
said decision means comprising means for making a tentative decision as to the signal points received corresponding to each of said data signals upon receipt of said data signals and a corresponding final decision as to said received signal points after a predetermined number of said data signals have been received, and
means for detecting a discrepancy between said tentative decision and said corresponding final decision,
said quality-monitoring means further comprises averaging circuitry for producing an average discrepancy,
said average discrepancy being an estimate of the error rate of reception over said channel, and
said fall back decisions are made on the basis of said estimate.

24. The modem of either of claims 22 or 23 wherein said fall back decisions are produced when said estimate exceeds a predetermined threshold for a predetermined time period.

25. The modem of either of claims 22 or 23 wherein said modem is initially trained to receive said information signals over said channel and wherein retraining of said modem is initiated when said estimate exceeds a predetermined threshold for a predetermined time period.

26. The modem of claim 25 wherein said fall back decisions are produced upon the occurrence of a predetermined number of retraining initiations in a predetermined time period.

27. A method for adjusting communication rates in a modem comprising
transmitting information signals to a remote device over a channel at any one of a multiplicity of communication rates,
receiving information signals from said remote device over said channel at any one of said communication rates,
monitoring the quality of said channel on the basis of said received information signals,
selecting a current communication rate based on said channel quality, and
indicating to said remote device that an increase in said current communication rate to a higher communication rate is desired, based on said channel quality, and implementing said increase only when said remote device concurs that said current communication rate may be increased, based on its own analysis of said channel quality.

28. A method for adjusting communication rates in a modem comprising
transmitting information signals to a remote device over a channel at any one of a multiplicity of transmission rates,
receiving information signals from said remote device over said channel at any one of a multiplicity of reception rates,
monitoring the quality of said channel on the basis of said received information signals,
selecting a current reception rate based on said channel quality, and
indicating to said remote device that an increase in said current reception rate to a higher reception rate is desired, based on said channel quality, and implementing said increase only when said remote device indicates its concurrence in implementing said increase, based on said remote device's analysis of said channel quality.

* * * * *

UNITED STATES PATENT AND TRADEMARK OFFICE
CERTIFICATE OF CORRECTION

PATENT NO. : 4,756,007
DATED : July 5, 1988
INVENTOR(S) : Qureshi et al.

It is certified that error appears in the above-identified patent and that said Letters Patent is hereby corrected as shown below:

In Other Publications
"Second Duplex Modem. . ." is changed to --CCITT Recommendation V. 22 (Geneva, 1980): 1200 Bits per Second Duplex Modem. . .--.

"Abstract, Japanese Appln. No. 57-133459, filed 7-29-82, vol. 8, No. 107, (E-245) [1544] May 19, 1984." is changed to --Abstract, Japanese Appln. No. 57-133459, filed 7-29-82, vol. 8, No. 10, (E-245) [1544] May 19, 1984.--.

In the Application
Column 1, line 36, "id." is changed to --$\underline{id}$.--.

Column 4, line 3, "40" is changed to --48--.

Column 6, line 38, "conputed" is changed to --computed--.

Column 8, line 7, "signals" is changed to --signal--.

Signed and Sealed this

Tenth Day of April, 1990

Attest:

HARRY F. MANBECK, JR.

Attesting Officer

Commissioner of Patents and Trademarks